(12) United States Patent
Oh et al.

(10) Patent No.: US 9,959,472 B2
(45) Date of Patent: May 1, 2018

(54) PARKING ASSISTING SYSTEM

(75) Inventors: Junseok Oh, Seoul (KR); Daeseung Kim, Seoul (KR); Bumsig Cho, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 437 days.

(21) Appl. No.: 14/357,101

(22) PCT Filed: Aug. 6, 2012

(86) PCT No.: PCT/KR2012/006236
§ 371 (c)(1),
(2), (4) Date: May 8, 2014

(87) PCT Pub. No.: WO2013/069877
PCT Pub. Date: May 16, 2013

(65) Prior Publication Data
US 2014/0307083 A1 Oct. 16, 2014

(30) Foreign Application Priority Data
Nov. 8, 2011 (KR) ........................ 10-2011-0115994

(51) Int. Cl.
*G06K 9/00* (2006.01)
*B62D 15/02* (2006.01)
*B60R 1/00* (2006.01)

(52) U.S. Cl.
CPC ............ *G06K 9/00798* (2013.01); *B60R 1/00* (2013.01); *B62D 15/027* (2013.01);
(Continued)

(58) Field of Classification Search
CPC ........... G06K 9/00798; G06K 9/00812; B62D 15/027; B62D 15/0275
See application file for complete search history.

(56) References Cited

U.S. PATENT DOCUMENTS 6,611,744 B1 * 8/2003 Shimazaki ................ B60R 1/00
180/168
7,640,108 B2 12/2009 Shimizu et al.
(Continued)

FOREIGN PATENT DOCUMENTS

EP   1123844 A1   8/2001
EP   1265305 A2   10/2002
(Continued)

OTHER PUBLICATIONS

Chinese Office Action dated Mar. 1, 2016 in Chinese Application No. 201280054824.6.
(Continued)

*Primary Examiner* — David N Werner
(74) *Attorney, Agent, or Firm* — Saliwanchik, Lloyd & Eisenschenk

(57) ABSTRACT

Disclosed is a parking assist system including a camera unit for photographing front or rear view of a vehicle, and a display unit for displaying a front or rear view image of the vehicle photographed by the camera unit, the system characterized by: a processor unit generating a first and second parking guide line, one being perpendicular to the other, at an area which is apart from the vehicle by a predetermined distance, and generating an estimated travel trajectory line based on steering angle information obtained from a steering angle sensor of the vehicle; and an overlay unit for overlaying the photographed front or rear view image of the vehicle on the first and second parking guide lines and the estimated travel trajectory line.

12 Claims, 3 Drawing Sheets

(52) U.S. Cl.
CPC ....... *B62D 15/028* (2013.01); *B62D 15/0275* (2013.01); *G06K 9/00812* (2013.01); *B60K 2350/1076* (2013.01)

(56) References Cited

U.S. PATENT DOCUMENTS

| | | | |
|---|---|---|---|
| 8,049,778 B2* | 11/2011 | Kuboyama | G06K 9/00812 348/118 |
| 2002/0104700 A1 | 8/2002 | Shimazaki et al. | |
| 2003/0060972 A1* | 3/2003 | Kakinami | B62D 15/027 701/532 |
| 2008/0266137 A1 | 10/2008 | Son | |
| 2009/0079828 A1* | 3/2009 | Lee | B60R 1/00 348/148 |
| 2009/0207045 A1* | 8/2009 | Jung | G06T 7/0044 340/932.2 |
| 2010/0066825 A1* | 3/2010 | Kuboyama | B62D 15/0275 348/118 |
| 2011/0018991 A1* | 1/2011 | Watanabe | B60R 1/00 348/118 |
| 2013/0169792 A1* | 7/2013 | Mathes | B62D 15/027 348/119 |

FOREIGN PATENT DOCUMENTS

| | | |
|---|---|---|
| EP | 1493632 A1 | 1/2005 |
| EP | 1674376 A2 | 6/2006 |
| EP | 1862375 A2 | 12/2007 |
| JP | 2000-313292 A | 11/2000 |
| JP | 2001-055099 A | 2/2001 |
| JP | 2008-037320 A | 2/2008 |
| JP | 2009-298385 A | 12/2009 |
| JP | 2010-064750 A | 3/2010 |
| WO | WO-2010098216 A1 | 9/2010 |
| WO | WO-2012028230 A1 * | 3/2012 ............... B60D 1/36 |

OTHER PUBLICATIONS

International Search Report in International Application No. PCT/KR2012/006236, filed Aug. 6, 2012.

European Search Report dated Sep. 9, 2015 in European Application No. 12847022.6.

* cited by examiner

[Fig. 1]
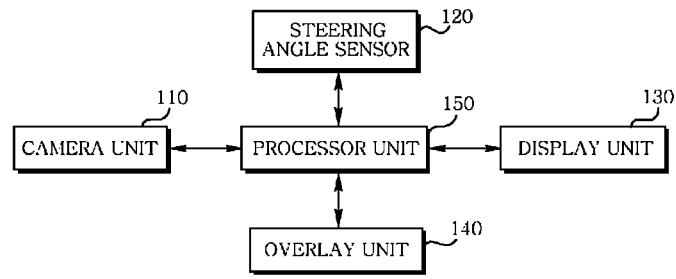
[Fig. 2]
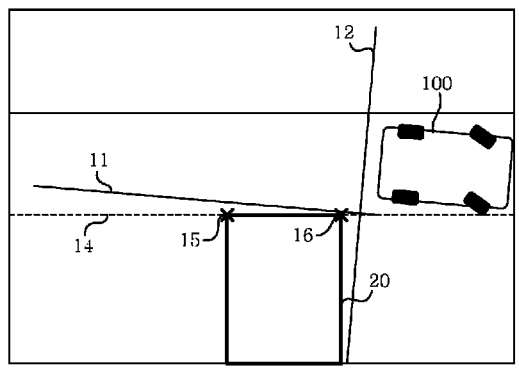
[Fig. 3]
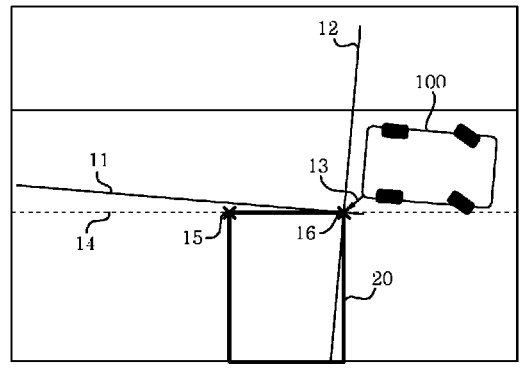

[Fig. 4]
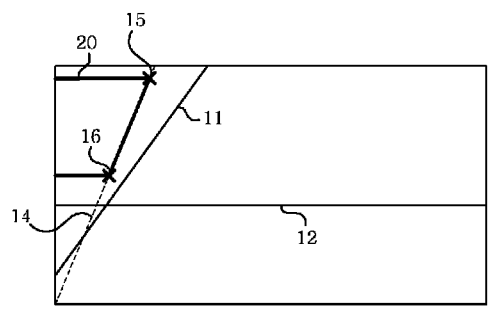
[Fig. 5]
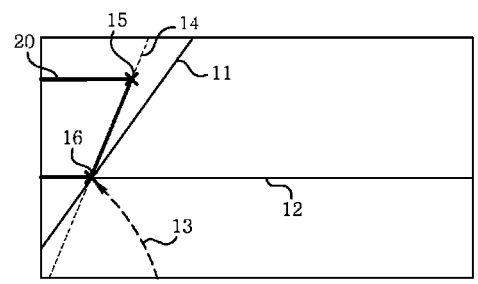
[Fig. 6]
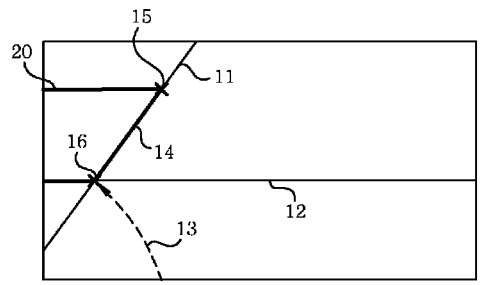

[Fig. 7]
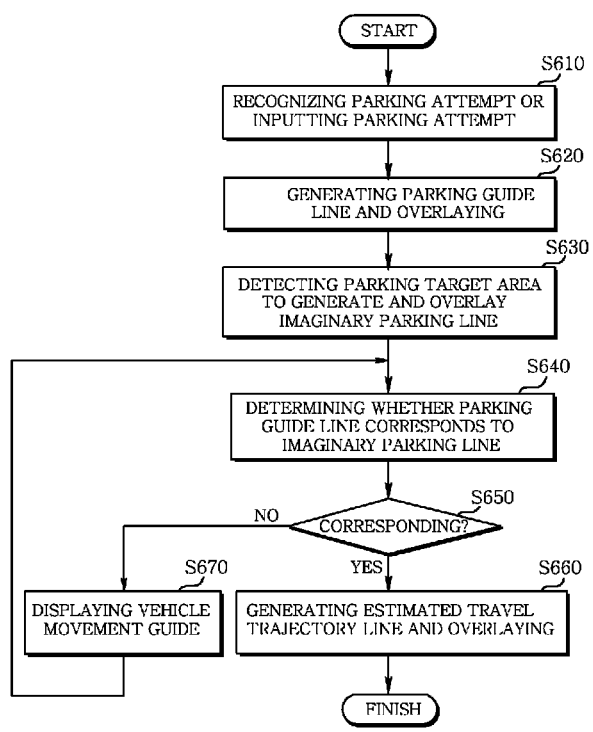

PARKING ASSISTING SYSTEM

CROSS-REFERENCE TO RELATED APPLICATIONS

This application is the U.S. national stage application of International Patent Application No. PCT/KR2012/006236, filed Aug. 6, 2012, which claims priority to Korean Application No. 10-2011-0115994, filed Nov. 8, 2011, the disclosures of each of which are incorporated herein by reference in their entirety.

TECHNICAL FIELD

The teachings in accordance with exemplary embodiments of this invention generally relate to a parking assisting system, and more particularly to a parking assisting system (hereinafter 'parking assisting system' and 'parking assist system' may be interchangeably used) configured to assist parking using a front view camera or a rear view camera mounted on a vehicle.

BACKGROUND ART

Recently, modern vehicles provide sophisticated functionalities, satisfactions and conveniences to drivers through increased power performance and other handy devices.

In a non-limiting example, recent trend is that propagation of front/rear/left/right view cameras for parking assist and an integrated display device capable of grasping status of a vehicle at a glance is widely popularized. A driver can view presence of objects or obstacles (including people) surrounding a vehicle and learn a distance to an object through cameras mounted at a front side or a rear side of the vehicle, a distance measuring sensor and a display device.

In the past, people have attempted to ameliorate the lack of visibility by placing mirrors, sensors and/or cameras at various locations throughout the vehicle. These devices have generally proven to be a reliable method of viewing an area surrounding and behind the vehicle while in reverse. While existing cameras, minors and/or sensors have prevented many unfortunate events, problems still persist and accidents are still occurring. These devices typically have provided the vehicle operator with display of views of front or rear areas of the vehicle during parking, simple display of trajectories based on steering direction and display of distance to an object. Thus, a parking assist system capable of being more intuitive and increasing user satisfaction than the prior art is badly needed.

DISCLOSURE OF INVENTION

Technical Problem

Accordingly, the present invention has been made keeping in mind with the above requirements or problems occurring in the prior art, and the present invention is to provide a parking assist system capable of being intuitive and assisting parking of a vehicle.

Technical problems to be solved by the present invention are not restricted to the above-mentioned statement, and any other technical problems not mentioned so far will be clearly appreciated from the following description by skilled in the art.

Solution to Problem

An object of the invention is to solve at least one or more of the above problems and/or disadvantages in whole or in part and to provide at least the advantages described hereinafter. In order to achieve at least the above objects, in whole or in part, and in accordance with the purposes of the invention, as embodied and broadly described, and in one general aspect of the present invention, there is provided a parking assist system including a camera unit for photographing front or rear view of a vehicle, and a display unit for displaying a front or rear view image of the vehicle photographed by the camera unit, the system characterized by: a processor unit generating a first and second parking guide line, each line being perpendicular to the other, at an area which is apart from the vehicle by a predetermined distance, and generating an estimated travel trajectory line based on steering angle information obtained from a steering angle sensor of the vehicle; and an overlay unit for overlaying the photographed front or rear view image of the vehicle on the first and second parking guide lines and the estimated travel trajectory line.

Preferably, the processor unit detects a parking target area from the photographed front or rear view image of the vehicle to generate an imaginary parking line.

Preferably, the processor unit detects at least one parking target area from the photographed front or rear view image of the vehicle to extract two outer corners of the at least one parking target area as two reference points and to generate an imaginary parking line connecting the two reference points.

Preferably, the processor unit overlays the estimated travel trajectory line on the photographed front or rear view image of the vehicle, if relationship between the imaginary parking line and the first and second parking guide lines meets a predetermined condition.

Preferably, the processor unit generates a first parking guide line which is apart from a center of a front axle or a rear axle by a predetermined distance and is perpendicular to the front axle or the rear axle, and a second parking guide line which is apart from the center of the front axle or the rear axle by a predetermined distance from and is parallel with the front axle or the rear axle.

Preferably, the processor unit determines whether an angle between the imaginary parking line and any one parking guide line of the first and second parking guide lines corresponds to or falls into a predetermined range.

Preferably, the overlay unit overlays the estimated travel trajectory line on the photographed front or rear view image of the vehicle based on the steering angle information of the vehicle, if the angle between the imaginary parking line and any one parking guide line of the first and second parking guide lines corresponds to or falls into a predetermined range.

Preferably, the processor unit determines whether a coordinate of a reference point nearest to the vehicle in the reference points corresponds to a coordinate of an intersection point between the first and second parking guide lines.

Preferably, the overlay unit overlays the estimated travel trajectory line on the photographed front or rear view image of the vehicle based on the steering angle information of the vehicle, if the coordinate of the reference point nearest to the vehicle in the reference points corresponds to the coordinate of the intersection point between the first and second parking guide lines.

Preferably, the overlay unit sequentially updates the estimated travel trajectory line as the vehicle advances to the parking target area.

Advantageous Effects of Invention

The parking assisting system according to exemplary embodiments of the present invention has an advantageous effect in that two parking guide lines and one estimated travel trajectory line are displayed for parking assist, to increase visibility of a parking target area and an estimated vehicle trajectory, whereby a parking success rate can be improved.

BRIEF DESCRIPTION OF DRAWINGS

The teachings of the present invention can be readily understood by considering the following detailed description in conjunction with the accompanying drawings, in which:

FIG. 1 is a schematic block diagram illustrating configuration of a parking assisting system according to an exemplary embodiment of the present invention;

FIG. 2 is a schematic view illustrating a concept of a parking assist according to an exemplary embodiment of the present invention;

FIG. 3 is a schematic view illustrating a concept of a parking assist according to an exemplary embodiment of the present invention;

FIG. 4 is a schematic view illustrating a scene displayed on a display unit of a parking assisting system according to an exemplary embodiment of the present invention;

FIG. 5 is a schematic view illustrating a scene displayed on a display unit of a parking assisting system according to an exemplary embodiment of the present invention;

FIG. 6 is a schematic view illustrating a scene displayed on a display unit of a parking assisting system according to an exemplary embodiment of the present invention; and FIG. 7 is a flowchart of a parking assisting system according to an exemplary embodiment of the present invention.

BEST MODE FOR CARRYING OUT THE INVENTION

The following description is not intended to limit the invention to the form disclosed herein. Consequently, variations and modifications commensurate with the following teachings, and skill and knowledge of the relevant art are within the scope of the present invention. The embodiments described herein are further intended to explain modes known of practicing the invention and to enable others skilled in the art to utilize the invention in such, or other embodiments and with various modifications required by the particular application(s) or use(s) of the present invention.

The disclosed embodiments and advantages thereof are best understood by referring to FIGS. 1-7 of the drawings, like numerals being used for like and corresponding parts of the various drawings. Other features and advantages of the disclosed embodiments will be or will become apparent to one of ordinary skill in the art upon examination of the following figures and detailed description.

It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

It will be understood that the terms "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. That is, the terms "including", "includes", "having", "has", "with", or variants thereof are used in the detailed description and/or the claims to denote non-exhaustive inclusion in a manner similar to the term "comprising".

Furthermore, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated.

That is, in the drawings, the size and relative sizes of layers, regions and/or other elements may be exaggerated or reduced for clarity. Like numbers refer to like elements throughout and explanations that duplicate one another will be omitted. Now, the present invention will be described in detail with reference to the accompanying drawings.

Words such as "thereafter," "then," "next," "therefore", "thus", etc. are not intended to limit the order of the processes; these words are simply used to guide the reader through the description of the methods.

It will be understood that when an element is referred to as being "connected" or "coupled" to another element, it can be directly connected or coupled to the other elements or intervening elements may be present. In contrast, when an element is referred to as being "directly connected" or "directly coupled" to another element, there are no intervening elements present. As may be used herein, the terms "substantially" and "approximately" provide an industry-accepted tolerance for its corresponding term and/or relativity between items.

The terminology used herein is for the purpose of describing particular embodiments only and is not intended to be limiting of the general inventive concept. As used herein, the singular forms "a", "an" and "the" are intended to include the plural forms as well, unless the context clearly indicates otherwise.

The suffixes 'module', 'unit' and 'part' may be used for elements in order to facilitate the disclosure. Significant meanings or roles may not be given to the suffixes themselves and it is understood that the 'module', 'unit' and 'part' may be used together or interchangeably.

Now, a parking assisting system according to exemplary embodiments of the present invention will be described in detail with reference to the accompanying drawings.

FIG. 1 is a schematic block diagram illustrating configuration of a parking assisting system according to an exemplary embodiment of the present invention, where only essential components are illustrated for easy understanding and explanation of an exemplary embodiment of the present invention.

In some exemplary embodiments, the parking assist system may include a camera unit (110) photographing front or rear view of a vehicle, a steering angle sensor (120) measuring an steering angle of the vehicle, a display unit (130) displaying a front or rear view image of the vehicle photographed by the camera unit, a parking guide line of vehicle, an imaginary parking line or an estimated travel trajectory line, an overlay unit (140) overlaying the parking guide line of vehicle, the imaginary parking line or the estimated travel trajectory line on the photographed front or rear view image of the vehicle, and a processor unit (150) generating a parking guide line of vehicle, an imaginary parking line or an estimated travel trajectory line and handling a process for parking assist.

The camera unit (110) may be mounted either at a front side or a rear side of the vehicle to photograph a front view image or a rear image of the vehicle. The camera unit (110) may be a general vehicular camera. The camera unit (110) may be an infrared camera for obtaining a visibility at night. An image photographed by the conventional camera cannot provide sufficient information for parking assist on a cloudy day or at night when a sufficient light is not provided, due to brightness of lens (F-number) of the camera unit (110).

The camera unit (110) may photograph a front area, a rear area or a parking area of the vehicle and provide the photographed information to the display unit (130) inside the vehicle. The camera unit (110) is preferably equipped with an auto-focusing (AF) function.

The steering angle sensor (120) is a sensor for sensing a steering angle of a steering wheel of a vehicle, and may sense and provide a steering angle of the steering wheel to the processor unit (150).

The processor unit (150) may cause the provided steering angle of steering wheel to be displayed on the display unit (130). The processor unit (150) may cause combine the steering angle with the estimated travel trajectory line (to be described later) and cause a travel trajectory of the vehicle to be displayed on the display unit (130).

The display unit (130) is a kind of a monitor mounted on a vehicle, and can display status or travel information of a vehicle. The display unit (130) may be operated in association with navigation or audio system. The display unit (130) that includes a touch panel can recognize a driver touch input or a user touch input. The display unit (130) may display data or information obtained from the camera unit (110), the steering angle sensor (120) and the overlay unit (140).

The processor unit (150) may generate data for parking assist. In a non-limiting example, the processor unit (150) may generate at least any one of a parking guide line, an imaginary parking line and an estimated travel trajectory line. The processor unit (150) may generate first and second parking guide lines, one being perpendicular to the other, at an area which is apart from the vehicle by a predetermined distance. The processor unit (150) may generate mutually perpendicular first and second parking lines at an area which is apart from a corner of a front side bumper or a rear side bumper of the vehicle or from a center of a front axle or a rear axle, by a predetermined distance.

The processor unit (150) may detect an actual parking line from the photographed front view image or rear view image. A method of detecting the actual parking line may be performed by using an image processing method, but the method is not particularly restricted thereto in the present invention.

In a non-limiting example, the actual line may include a plurality of horizontal lines (first lines) and a plurality of vertical lines (second lines). Particularly, assuming a parking lot provides a right angled parking, a horizontal line (first line) would be an actual parking line shared by continuous parking target areas, and a vertical line (second line) would be an actual parking line shared only by adjacent parking target areas, where the horizontal line (first line) includes two lines inside and outside of the parking target area. A parking lot providing a parallel parking may be applied with the same principle.

The processor unit (150) may generate an imaginary parking line identical or corresponding to the detected actual parking line. However, the imaginary parking line includes only the outside horizontal line among the horizontal lines for easy recognition and intuition by a driver.

The processor unit (150) may determine whether the imaginary parking line matches the parking guide line. The processor unit (150) may measure an angle between imaginary parking line and the parking guide line to find out if they are matched. Furthermore, the processor unit (150) may generate two reference points on the imaginary parking line, where the reference point enables the driver to recognize or discern a targeted parking target area, such that the reference points may be defined by two points which are intersection points between the outer horizontal line of the imaginary parking line and two vertical lines in relevant parking target areas.

Therefore, the processor unit (150) may determine whether a reference point nearest to the vehicle among the two reference points corresponds to an intersection point between the two parking guide lines. The processor unit (150) may also determine whether an angle between the imaginary parking line and the parking guide line belongs to a predetermined range (e.g., −5°~+5°), and the intersection point of the parking guide line and a coordinate of the reference point are matched.

The processor unit (150) may guide the driver to travel to allow the intersection point to match the reference point, if the angle between the imaginary parking line and the parking guide line fails to belong to a predetermined range and if the intersection point of the parking guide line and a coordinate of the reference point fail to be matched. In a non-limiting example, the processor unit (150) may allow the guide to be displayed on the display unit (130) in the form of a notification message.

To this end, the processor unit (150) preferably recognizes the photographed front or rear view image of the vehicle as a coordinate, and stores coordinate information in storage.

In a case one of the conditions (whether the angle between the imaginary parking line and the parking guide line belongs to a predetermined range and whether the intersection point of the parking guide line and a coordinate of the reference point are matched) is satisfied, satisfaction of the reference points means that preparatory parking step has been completed. As a result, the processor unit (150) may generate an estimated travel trajectory line which is an estimated travel route of the vehicle. The estimated travel trajectory line may be moved in association with steering angle information from the steering angle sensor (120) of the vehicle.

The overlay unit (140) may overlay the parking guide line, the imaginary parking line and the estimated travel trajectory line generated by the processor unit (150) on the photographed front or rear view image of the vehicle, where the overlaid scene may be displayed on the display unit (130).

It can be noted that the exemplary embodiment of the present invention uses lines for parking assist. Use of lines can remove complicated overlay to provide an increased visibility and understanding for the driver over a rectangle (or a polygon) that displays perspective used by the prior art, detailed explanation of which will be provided later with reference to FIGS. 2 and 3.

FIGS. 2 and 3 are schematic views illustrating a concept of a parking assist according to an exemplary embodiment of the present invention. For easy understanding, FIGS. 2 and 3 illustrate a situation seen from above where a driver attempts to park a vehicle (100) at a parking target area (20).

Now, explanation is provided based on FIG. 2. A first parking guide line (11) and a second parking guide line (12) may be generated at an area which is apart from the vehicle (100) by a predetermined distance, an imaginary parking line (14) corresponding to the horizontal line among the actual parking lines may be generated and first and second reference points (15, 16) present on the imaginary parking line (14) may be generated. The first and second reference points (15, 16) correspond to intersections between the horizontal line or imaginary parking line (14)} and the vertical lines of actual parking line on the parking target area (20).

It should be apparent that the aforementioned various lines and points (11, 12, 14, 15, 16) are generated by the processor unit (150), and overlaid by the overlay unit (140) to be displayed on the display unit (130), but lines and points are not actual but imaginary.

The parking assist system according to an exemplary embodiment of the present invention provides a method in which a vehicle is guided to a predetermined area (hereinafter referred to as "parking preparation position"), and the vehicle can be safely parked at the parking target area, once the vehicle travels from the parking preparation position, maintaining the vehicle at a predetermined steering angle.

Means for allowing the vehicle to park at the parking preparation position is to satisfy one of the two conditions mentioned with reference to FIG. 1. The first condition is related to whether an angle between the first or second parking guide lines (11, 12) and the imaginary parking line (14) corresponds to a predetermined range. Due to the fact that the first or second parking guide lines (11, 12) being perpendicularly formed, one of the conditions is whether an angle between the imaginary parking line (14) and the first parking guide line (11) belongs to a predetermined range (−5°~+5°), or an angle between the second parking guide line (120 and the imaginary parking line (14) corresponds to a range of 85°~95°, for example. However, it should be apparent that these angles do not restrict the scope of the present invention.

The second condition is whether the intersection between the first parking guide line (11) and the second parking guide line (12) and the reference point (16) are matched. Alternatively, the second condition is whether a coordinate of the intersection between the first parking guide line (11) and the second parking guide line (12) and x coordinate of coordinates of the reference point (16) are matched.

The reason of explaining the second conditions in the above two ways is that the parking assist system can be performed through the present invention if only the intersection and the x coordinate of the second reference point (16) are matched.

That is, once the vehicle reaches the parking preparation position through any one of the abovementioned conditions, the driver can completely enter the parking target area (20) if the driver advances or reverses the vehicle while maintaining a predetermined steering angle. That is, a complete perfect parking is possible. Therefore, y coordinates of the abovementioned points (position of longitudinal direction in FIGS. 2 and 3) correspond to secondary conditions.

FIG. 2 illustrates a case where all the first and second conditions are not met, while FIG. 3 illustrates a case where the second condition is met.

The processor unit (150) in FIG. 2 can determine that the vehicle (100) has not reached the parking preparation position through dissatisfaction of first and second conditions, and therefore can generate a message for guiding movement of the vehicle (100) and display the movement on the display unit (130).

The processor unit (150) in FIG. 3 can determine that the vehicle (100) has reached the parking preparation position through satisfaction of first and second conditions, steer the estimated travel trajectory line (13) to correspond to the second reference point (16) for parking assist of the vehicle (100), and therefore can generate a message notifying that the steering angle be maintained and display the message on the display unit (130).

FIG. 4 is a schematic view illustrating a scene displayed on a display unit of a parking assisting system according to an exemplary embodiment of the present invention. Particularly, FIG. 4 illustrates a scene displayed on the display unit (130) in FIG. 2. That is, FIG. 4 illustrates that an angle between the first parking guide line (11) or the second parking guide line (12) and the imaginary parking line (14) fails to correspond to a predetermined range.

FIG. 5 is a schematic view illustrating a scene displayed on a display unit of a parking assisting system according to an exemplary embodiment of the present invention.

Particularly, FIG. 5 illustrates a scene displayed on the display unit (130) in FIG. 3. That is, FIG. 5 illustrates that an intersection between the first parking guide line (11) and the second parking guide line (12) and the second reference point (16) correspond to each other.

FIG. 6 is a schematic view illustrating a scene displayed on a display unit of a parking assisting system according to an exemplary embodiment of the present invention. Particularly, FIG. 6 illustrates that an intersection between the first parking guide line (11) and the second parking guide line (12) and the second reference point (16) correspond to each other, and the first parking guide line (11) and the imaginary parking line (14) correspond each other.

MODE FOR THE INVENTION

FIG. 7 is a flowchart of a parking assisting system according to an exemplary embodiment of the present invention in which a method of operation of the parking assist system is illustrated.

First step is to include recognizing, by the processor unit (150), parking attempt of a driver, or personally inputting, by the driver, a parking attempt (S610). The method of recognizing, by the processor unit (150), the driver's parking attempt is for the driver to place a transmission lever to a reverse (R) position, or for the driver to depress a button in the vehicle for notifying a parking attempt, which can be recognized by the processor unit (150). The button in the vehicle for notifying the parking attempt may be a soft type button displayed on the display unit (130) for the drive to touch, or a hard type button physically mounted in the vehicle such as an electronic parking button.

Furthermore, the driver may notify start of procedure for parking by depressing a button mounted inside the vehicle for notifying the parking attempt.

Successively, the first and second parking guide lines may be generated by the processor unit (150), and the parking guide lines may be overlaid by the front or rear view image of the vehicle by the overlay unit (140) (S620). Then, the processor unit (150) may detect a parking target area using the front or rear view image of the vehicle obtained by the camera unit (110) to generate an imaginary parking line, where the imaginary parking line and the image may be overlaid by the overlay unit (140) (S630).

The processor unit (150) may determine whether the first and second parking guide lines correspond to the imaginary parking line (S640), where criterion of determining whether the first and second parking guide lines correspond to the imaginary parking line may be determined by whether the first and second conditions explained with reference to FIGS. 2 and 3 are satisfied.

That is, determination is made as to whether an angle between the imaginary parking line and the first and second parking guide lines corresponds to a predetermined range, whether an intersection between the first and second parking guide lines and the second reference point on the imaginary parking line correspond to each other, or whether the intersection and an x coordinate of the second reference point correspond to each other.

If the angle corresponds to a predetermined range, or the intersection and the reference point are matched, the processor unit (150) may generate an estimated travel trajectory line, and display the estimated travel trajectory line on the display unit (130) using the overlay unit (140) (S660). The overlay unit (140) may sequentially update the estimated travel trajectory line as the vehicle advances to the parking target area.

In a non-limiting example, if the vehicle approaches the parking target area, the overlay unit (140) may reduce size or length of the estimated travel trajectory line, and if the vehicle is distanced from the parking target area, the overlay unit (140) may increase the size or length of the estimated travel trajectory line.

If the angle fails to correspond to a predetermined range, the processor unit (150) may generate an indication or a message for vehicle movement guide, which may be displayed on the display unit (130) (S670). Thereafter, flow may advance to S640 again.

The previous description of the present invention is provided to enable any person skilled in the art to make or use the invention. Various modifications to the invention will be readily apparent to those skilled in the art, and the generic principles defined herein may be applied to other variations without departing from the spirit or scope of the invention. Thus, the invention is not intended to limit the examples described herein, but is to be accorded the widest scope consistent with the principles and novel features disclosed herein.

INDUSTRIAL APPLICABILITY

The parking assisting system according to exemplary embodiments of the present invention has an industrial applicability in that two parking guide lines and one estimated travel trajectory line are displayed for parking assist, to increase visibility of a parking target area and an estimated vehicle trajectory, whereby a parking success rate can be improved.

The invention claimed is:

1. A parking assist system, the system comprising:
a camera unit configured to detect a front view image or a rear view image of a vehicle;
a display unit configured to display the front view image or the rear view image of the vehicle;
a steering angle sensor configured to detect a steering angle of the vehicle; and
a processor unit configured to:
generate a first parking guide line and a second parking guide line perpendicular to the first parking guide line,
generate an imaginary parking line corresponding to an actual parking area,
generate two reference points on the imaginary parking line,
determine whether one of a first condition and a second condition is satisfied,
generate an estimated travel trajectory line and display the estimated travel trajectory line on the display unit when one of the first condition and the second condition is satisfied, and
generate a message for vehicle movement guide and display the message on the display unit when neither of the first condition and the second condition is satisfied,
wherein the first condition is if an angle between the imaginary parking line and one of the first parking guide line and the second parking guide line is within a predetermined range,
wherein the second condition is if an intersection of the first parking guide line and the second parking guide line matches one of the two reference points, and
wherein the first parking guide line and the second parking guide line are generated at an area which is spaced apart from the vehicle by a predetermined distance.

2. The parking assist system of claim 1, wherein the processor unit detects a parking target area from the detected front or rear view image of the vehicle to generate the imaginary parking line.

3. The parking assist system of claim 2, wherein the processor unit overlays the estimated travel trajectory line on the detected front or rear view image of the vehicle, if relationship between the imaginary parking line and the first and second parking guide lines meets a predetermined condition.

4. The parking assist system of claim 2, wherein the processor unit determines whether an angle between the imaginary parking line and any one parking guide line of the first and second parking guide lines falls into a predetermined range.

5. The parking assist system of claim 4, wherein the processor unit overlays the estimated travel trajectory line on the detected front or rear view image of the vehicle based on the steering angle information of the vehicle, if the angle between the imaginary parking line and any one parking guide line of the first and second parking guide lines falls into the predetermined range.

6. The parking assist system of claim 2, wherein the processor unit overlays the imaginary parking line and the detected front or rear view image of the vehicle.

7. The parking assist system of claim 2, wherein the processor unit overlays the first and second parking guide lines and the detected front or rear view image of the vehicle.

8. The parking assist system of claim 1, wherein the processor unit detects at least one parking target area from the detected front or rear view image of the vehicle to extract two outer corners of the at least one parking target area as two reference points and to generate the imaginary parking line connecting the two reference points.

9. The parking assist system of claim 8, wherein the processor unit determines whether a coordinate of a reference point nearest to the vehicle in the reference points corresponds to a coordinate of an intersection point between the first and second parking guide lines.

10. The parking assist system of claim 9, wherein the processor unit overlays the estimated travel trajectory line on the detected front or rear view image of the vehicle based on the steering angle information of the vehicle, if the coordinate of the reference point nearest to the vehicle in the reference points corresponds to the coordinate of the intersection point between the first and second parking guide lines.

11. The parking assist system of claim 1, wherein the processor unit generates a first parking guide line which is apart from a center of a front axle or a rear axle by a predetermined distance and is perpendicular to the front axle or the rear axle, and a second parking guide line which is apart from the center of the front axle or the rear axle by a predetermined distance and is parallel with the front axle or the rear axle.

12. The parking assist system of claim 1, wherein the processor unit sequentially updates the estimated travel trajectory line as the vehicle advances to the parking target area.

\* \* \* \* \*